United States Patent [19]

Gehrmann

[11] Patent Number: 5,708,479
[45] Date of Patent: Jan. 13, 1998

[54] METHOD OF INSERTING A BACKGROUND PICTURE SIGNAL INTO PARTS OF A FOREGROUND PICTURE SIGNAL, AND ARRANGEMENT FOR PERFORMING SAID METHOD

[75] Inventor: Rainer Gehrmann, Alsbach-Haehnlein, Germany

[73] Assignee: U.S. Philips Corporation, New York, N.Y.

[21] Appl. No.: 661,000

[22] Filed: Jun. 10, 1996

[30] Foreign Application Priority Data

Jun. 28, 1995 [DE] Germany ............. 195 23 438.3

[51] Int. Cl.[6] ........................................ H04N 9/75
[52] U.S. Cl. ............................... 348/587; 348/592
[58] Field of Search ........................... 548/587, 590, 548/591, 592, 593, 594, 595; H04N 9/75, 9/74

[56] References Cited

U.S. PATENT DOCUMENTS 5,444,496  8/1995  Gehrmann ...................... 348/587
5,455,633  10/1995  Gehrmann ...................... 348/595

Primary Examiner—Sherrie Hsia
Attorney, Agent, or Firm—Edward W. Goodman

[57] ABSTRACT

In a method of inserting a background picture signal into key color-characterized parts of a foreground picture signal, the selectivity, i.e., the boundary between its foreground colors and the transition or mixed colors degenerated by the key color should be changeable within a frame period by means of masking. This provides the possibility of differently keying equal colors of different origin occurring in a picture—as a pure foreground color, on the one hand, and as a mixed color, on the other hand—namely, by dynamically switching the selectivity within a frame period by means of the chroma angle $\alpha_c$.

9 Claims, 2 Drawing Sheets $W_L = 90° - \alpha_L$ bei $\alpha_L > 0, S > 0$ $W_R = -90° - \alpha_R$ bei $\alpha_R < 0, S < 0$ $D_{KC} = |KC|$

METHOD OF INSERTING A BACKGROUND PICTURE SIGNAL INTO PARTS OF A FOREGROUND PICTURE SIGNAL, AND ARRANGEMENT FOR PERFORMING SAID METHOD

BACKGROUND OF THE INVENTION

1. Field of the Invention

The invention relates to a method of inserting a background picture signal into key color-characterized parts of a foreground picture signal, in which fading operations are performed between the picture signals in transition regions in dependence upon a control signal, while intermediate colors occurring in the transition regions in the foreground picture signal are transformed into new intermediate colors which constitute a transition from the color of the foreground picture signal to that of the background picture signal, the control signal having a first value in the region of the key color and reaching a second value at transition boundaries, the transition boundaries in the $C_b/C_r$ color plane being constituted by two straight lines of origin which represent the selectivity and each enclose an angle $\alpha_L$ and $\alpha_R$ with the vector of the key color.

2. Description of the Related Art

Such a method is known, for example, from DE 42 29 377 A1, corresponding to U.S. Pat. No. 5,455,633. The method can be used for removing the key color occurring in the key regions of a mixed picture signal, as well as transition colors occurring between the foreground picture signal and the key color, and possibly replacing these regions by a background picture signal. A particular problem in this respect is to recognize the transition colors as such and to suppress them, accordingly. The limit up to which parts of the key color or transition colors are removed from the mixed picture signal is constituted by transition boundaries which are formed by two straight lines of origin. All the color locations between these straight lines of origin and the color location KC of the key color are considered as key colors or as transition colors. Exclusively in the region between the key color and the transition boundaries, a part of the key color is removed from the mixed picture signal for generating the foreground picture signal. The straight lines of origin are arranged relative to the vector of the key color KC with the angles $\alpha_c$ of the $C_b/C_r$ color plane. This vector extends from the origin of the $C_b/C_r$ color plane to the color location KC of the key color. For a genuine keying result, it is now important that, in addition to the key color K itself, also the mixed colors produced upon a color transition to blue are keyed proportionately, i.e., the part of the key color should also be removed from these mixed colors in this picture region.

If, for example, red foreground objects are situated in front of a blue wall in a picture, purple mixed colors will be produced which must be keyed proportionately, i.e., they should be changed to other transition colors for the new background. However, if the same purple color is simultaneously present as a foreground color in the picture, this color should not be keyed in this case.

A method of separating the foreground picture signals from a mixed picture signal is known from DE 43 03 348 A1, corresponding to U.S. Pat. No. 5,444,496, in which only one parameter is used, namely, the angle by which the selectivity-representing straight boundary line defines a complete boundary chromaticity which should almost be considered as being free of the key color KC, and with reference to which transition colors can be detected. The key behavior for all color locations in the color plane $C_b/C_r$ can then be changed very rapidly (pixel by pixel) without requiring the build-up time for the computation of a keying table for the overall color plane.

SUMMARY OF THE INVENTION

It is an object of the invention to improve the method described in the opening paragraph in such a way that given colors of the foreground picture signal are treated differently during color keying than the same colors of the picture signal in the transition region to the key color.

According to the invention, this object is solved in that the straight lines of origin representing the selectivity are differently adjustable or switchable within a frame period by changing the angles $\alpha_L$ and $\alpha_R$.

The method according to the invention has the advantage that keying of the picture signal or removal of the key color is effected with a different selectivity, dependent on the picture region, which can easily be described by the chroma angle $\alpha$.

In the method according to the invention, the selectivity-representing straight lines of origin are easily and advantageously adjusted or switched by switching the angles $\alpha_L$ and $\alpha_R$ within a frame period by means of a mask signal.

These and other aspects of the invention will be apparent from and elucidated with reference to the embodiments described hereinafter.

DESCRIPTION OF THE PREFERRED EMBODIMENT

Figure 1A:
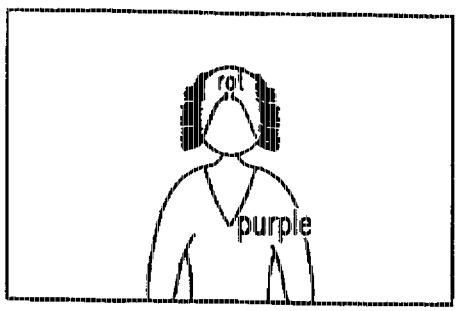
FIGS. 1a–1c shows diagrammatically a picture on a television display screen to explain different key regions as well as the associated $C_b/C_r$ color plane with the corresponding straight lines of origin.
Figure 1B:
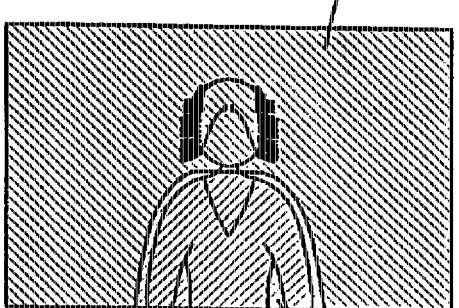

In the picture shown in FIG. 1a it is assumed that a red and a purple-colored object are simultaneously present in front of a blue wall, with the respective transition colors towards blue. To ensure that the purple-colored red transitions in the person's hair are keyed appropriately without simultaneously influencing the same purple colors of the person's clothing, for example, a region around the red object (hair) should be assigned a selectivity of the angle $\alpha_{RED}$ which comprises all pixels in the transition colors. It is thereby ensured that red colors are just not keyed anymore, but purple transition colors are keyed. Accordingly, a region around the purple-colored object (clothing) should be assigned the selectivity angle $\alpha_{PRP}$, so that in this case, the purple colors are excluded from the keying process and only purple transitions towards blue are taken into account, cf. FIG. 1b.

The selectivity angle $\alpha_c$ is always the chroma angle of the adjacent pure foreground color. The choice of selectivity is essentially only important for the transition colors. In any case, the foreground colors situated beyond the straight lines of origin remain unkeyed. Assuming that all occurring pure foreground colors are situated beyond the straight lines of origin, switching of the selectivity within a foreground object remains invisible. Similarly, switching of the selectivity within a pure key color region remains invisible as long as all relevant colors proximate to the switching process are actually located on the key color line, i.e., the R axis. Vectorial distance measurements of color locations on this straight line against the straight line of origin are all effected against the origin in this special case and thus remain independent of the angle of rotation of the straight lines of origin. By dynamically switching the selectivity within a frame or a frame period, an optimum treatment of the two color transitions is ensured.

Figure 1C:
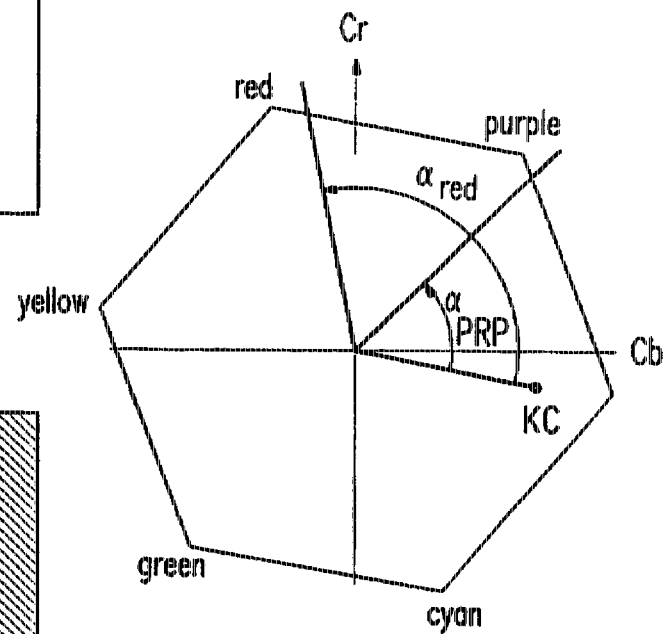

FIG. 1c shows the two assumed, selectivity-representing straight lines of origin $SEL_P$ and $SEL_R$ and their respective angles $\alpha_P$ and $\alpha_R$ with respect to the key color KC in the $C_b/C_r$ color plane. Normally, a dextrorotatory angle $\alpha_c$ should of course always be defined in the negative half-plane, but in this case, it has been omitted for the sake of clarity.

Figure 2:
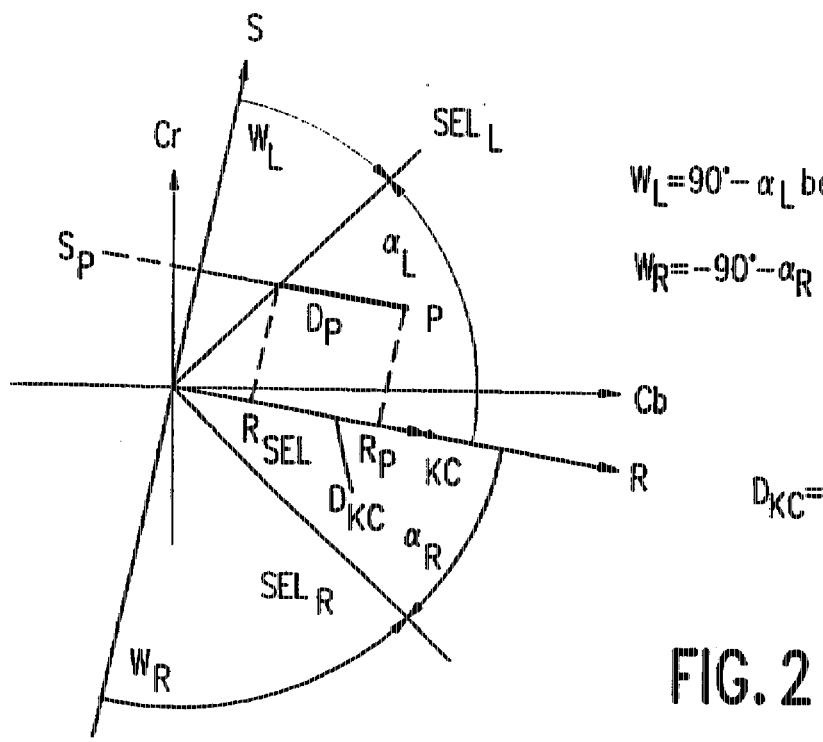
FIG. 2 shows the $C_b/C_r$ color plane with a rotated system of coordinates R/S.

The $C_b/C_r$ component color plane shown in FIG. 2, is rotated in a new system of coordinates R/S, in which the R axis points towards the vector of the key color KC.

This R/S coordinate system is particularly suitable for determining the vectorial KC distances. The absolute vectorial KC distance $D_P$ between an arbitrary point P in the positive half-plane and the selectivity-representing straight line $SEL_L$ can be described in accordance with FIG. 2 in the following manner.

The distance $D_P$ is the R coordinate $R_P$ of the point P, shortened by the R coordinate $R_{SEL}$ of the selectivity-representing straight line $SEL_L$ at the S value $S_P$ of the point P; $R_{SEL}$ is obtained via the tangent of the angle $W_L$ (in which $W_L=90°-\alpha_L$):

$$D_P=R_P-R_{SEL}=R_P-S_P* \tan (W_L) \qquad (1)$$

The control signal k is defined as the relative distance of the point P, so that $D_P$ should be related to the maximum distance $D_{KC}$ of the key color itself:

$$k=D_P/D_{KC}=(R_P-S_P* \tan (W_L)/D_{KC} \qquad (2)$$

Thus, k can be determined in a relatively simple manner: in addition to the dependence on the dynamic coordinates $R_P$, $S_P$ of a pixel P and the static dependence on $D_{KC}$, there is only the variable or switchable dependence on the selectivity via the tangent of the above-defined angle $\tan(W_L)$. In this context, the angle $W_L$ should be replaced by the parameter $W_R$ when there is a color point in the negative switching plane (in which $W_R=90°-\alpha_R$).

The control signal k then assumes values of between 1 and 0 in a smooth transition. The value 1 of the control signal k is reached when the vector of $D_P$ has the same value as the vector $D_{KC}$. This is the case when an arbitrary pixel in the color space has the same vectorial distance to the transition boundaries as the key color KC. This pixel is fully suppressed when separating the foreground picture signal, because this pixel is very likely to be allocated to the key color KC. The same applies to all pixels with color locations from the origin of the $C_b/C_r$ color plane to the key color KC.

The KC part of pixels with color locations beyond the straight lines of origin are also removed, but residual color components which are located on the transition boundaries are retained. When such a pixel approaches the transition boundaries $SEL_L$ or $SEL_R$, the value $D_P$ relative to the vector $D_{KC}$ becomes increasingly smaller so that also the control signal k assumes an ever-decreasing value which is finally 0 at the boundaries $SEL_L$ and $SEL_R$. In this transition region, increasingly smaller parts of the key color KC are suppressed, so that finally color components KC are no longer suppressed at the boundaries $SEL_L$ and $SEL_R$ or beyond these boundaries.

Figure 3:
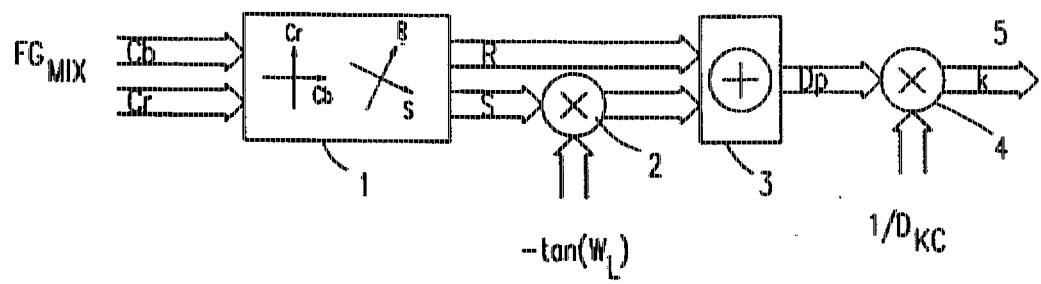
FIG. 3 is a block diagram for generating the control signal k in accordance with a known method.

An arrangement for elaborating this equation is shown in FIG. 3. A coordinate transformation circuit 1 receives the foreground chroma signals $C_b$ and $C_r$ which are subjected to an R/S coordinate rotation so that the key color KC is subsequently located on the R coordinate. The coordinates R and S generated in the arrangement 1 are applied directly and via a multiplier 2 to inputs of an adder 3, while the S signal is multiplied by a negative tangential value of the angle $W_L$ in the multiplier 2. The distance signal $D_P$ of the pixel P is then obtainable from the output of the adder 3; this signal is subsequently multiplied in a further multiplier 4 by the reciprocal value of the key color $D_{KC}$, so that a control signal k in accordance with the equation (2) is obtainable from the output 5 of the multiplier 4.

Figure 4:
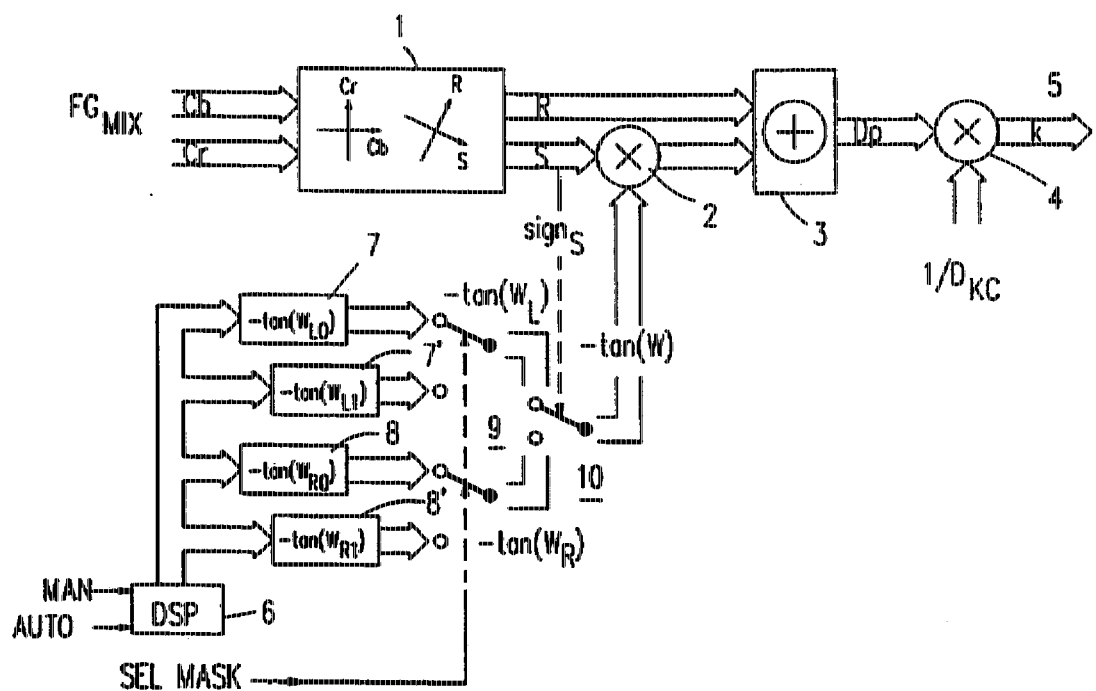
FIG. 4 is a block diagram for generating the control signal k in accordance with the method according to the invention.

As regards the main signal processing operation, the arrangement, shown in FIG. 4, for performing the method according to the invention is principally the same as the arrangement shown in FIG. 3, while identical parts are denoted by the same reference signs. The essential difference is the processing of the tangential angle signals of $W_L$ and $W_R$ by means of the mask signal SEL-MASK, i.e., the possibility of masking the selectivity and the possibility of switching between the left and the right selectivity lines or straight lines of origin. The selectivity mask signal is generated and selected similarly as in current key-masking operations. However, in this case, a 1-bit signal is sufficient, whose 0 status corresponds, for example, to the selectivity value 0 ($SEL_{L0}$ and $SEL_{R0}$) and whose 1 status corresponds to the selectivity value 1 ($SEL_{L1}$ and $SEL_{R1}$). Both values are then manually or automatically adjusted, and converted, for example by, a digital signal processor 6, into tangential angles and made available at its outputs. These signals are then obtainable from the memory blocks 7, 7' and 8, 8', with the status of the mask signal SEL-MASK finally deciding which of the two values is currently valid. To this end, the mask signal is applied to the control input of a switch 9 which connects the outputs of the blocks 7, 8 and 7', 8' to the outputs of the switch 9. These outputs are connected to a further switch 10 which is switched by the sign signal of the S coordinates. The sign of the S value of the pixel P ($S_P$) then decides whether the levorotatory selectivity line $SEL_L$ or the dextrorotatory selectivity line $SEL_R$ of the preselected selectivity value is used, i.e., the fact whether a pixel is in either the positive or the negative half-plane is decisive in this case.

I claim:

1. A method of inserting a background picture signal into key color-characterized parts of a foreground picture signal, said method comprising the steps:

performing fading operations between the picture signals in transition regions in dependence upon a control signal (k); while transforming intermediate colors occurring in the transition regions in the foreground picture signal from the color of the foreground picture signal to that of the background picture signal, wherein the control signal (k) has a first value in the region of the key color and reaches a second value at transition boundaries, the transition boundaries in a $C_b/C_r$ color plane being constituted by two straight lines of origin, each of which representing a selectivity and each enclosing an angle ($\alpha_L$ and $\alpha_R$) with the vector of the key color, characterized in that the straight lines of origin representing the selectivity ($SEL_L$ and $SEL_R$) are differently adjustable within a frame period by changing the angles ($\alpha_L$ and $\alpha_R$).

2. A method as claimed in claim 1, characterized in that the straight lines of origin representing the selectivity are adjusted during the frame period by changing the angles $\alpha_L$ and $\alpha_R$ by means of a mask signal.

3. A method as claimed in claim 2, characterized in that the mask signal is a 1-bit signal.

4. A method as claimed in claim 2, characterized in that complementary angles ($W_L$, $W_R$) between said straight lines of origin and transformed coordinate axes (R, S) are used for adjusting said straight lines instead of the angles ($\alpha_L$ and $\alpha_R$), in accordance with the equation $W_L=90°-\alpha_L$ and $W_R=90°-\alpha_R$.

5. A method as claimed in claim 4, characterized in that the selectivity-representing straight line of origin ($SEL_L$) with the angle ($W_L$) is used when the pixel to be processed is situated in the positive half plane of the R/S system of coordinates, and in that the selectivity-representing straight line of origin ($SEL_R$) with the angle ($W_R$) is used when the pixel to be processed is situated in the negative half plane of the R/S system of coordinates.

6. A method as claimed in claim 4, characterized in that the control signal (k) is generated in accordance with the general equation $$k=D_P/D_{KC}=(R_P-S_P* \tan(W))/D_{KC}$$

wherein $W=W_L$ or $W_R$, $D_{KC}$ is the maximum distance of the key color, $D_P$ is an absolute vectorial distance, $S_P$ is the S coordinate of point P, and $R_P$ is the R coordinate of point P.

7. An arrangement for inserting a background picture signal into key color-characterized parts of a foreground picture signal, in which fading operations are performed between the picture signals in transition regions in dependence upon a control signal (k), while intermediate colors occurring in the transition regions in the foreground picture signal are transformed into new intermediate colors which constitute a transition from the color of the foreground picture signal to that of the background picture signal, the control signal (k) having a first value in the region of the key color and reaching a second value at transition boundaries, the transition boundaries in a $C_b/C_r$ color plane being constituted by two straight lines of origin, each of which representing a selectivity and each enclosing an angle ($\alpha_L$ and $\alpha_R$) with the vector of the key color, wherein the straight lines of origin representing the selectivity ($SEL_L$ and $SEL_R$) are differently adjustable within a frame period by changing the angles ($\alpha_L$ and $\alpha_R$), characterized in that said arrangement comprises:

a coordinate transformation circuit having an input for receiving the color signals ($C_b$, $C_r$) and outputs for supplying transformed coordinate signals (R, S), with the color location of the key color (KC) being on the R axis;

a first multiplier having a first input for receiving one of said transformed coordinate signals (S) from the coordinate transformation circuit, a second input for receiving a negative tangential value of an angle (W), and an output for supplying a product signal;

an adder having a first input for receiving the other of said transformed coordinate signals (R) from the coordinate transformation circuit, a second input for receiving the product signal from the first multiplier, and an output for supplying a sum signal; and a second multiplier having a first input for receiving the sum signal from the adder, a second input for receiving a reciprocal value of the key color vector ($D_{KC}$), and an output for supplying the control signal (k).

8. An arrangement as claimed in claim 7, characterized in that the arrangement further comprises a signal processor for generating the negative tangential values of angles ($W_L$ and $W_R$); and a switch for switching the negative tangential values of the angles within a frame period by means of a mask signal.

9. An arrangement as claimed in claim 8, characterized in that said arrangement further comprises a further switch controllable by the sign of the coordinate signal (S) for establishing a connection either between the tangent of the angle $W_L$ or the tangent of the angle $W_R$, and the second input of the first multiplier in accordance with the arrangement of a pixel to processed in the $C_b/C_r$ color plane.

* * * * *